(12) United States Patent
Zhao

(10) Patent No.: US 11,061,499 B2
(45) Date of Patent: Jul. 13, 2021

(54) DISPLAY PANEL

(71) Applicant: Wuhan China Star Optoelectronics Semiconductor Display Technology Co., Ltd., Wuhan (CN)

(72) Inventor: Chen Zhao, Wuhan (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 35 days.

(21) Appl. No.: 16/323,545

(22) PCT Filed: Jan. 17, 2019

(86) PCT No.: PCT/CN2019/072070
§ 371 (c)(1),
(2) Date: Feb. 6, 2019

(87) PCT Pub. No.: WO2020/118851
PCT Pub. Date: Jun. 18, 2020

(65) Prior Publication Data
US 2020/0192509 A1    Jun. 18, 2020

(30) Foreign Application Priority Data

Dec. 12, 2018   (CN) .......................... 201811520627.4

(51) Int. Cl.
*G06F 3/041*    (2006.01)
*G06F 3/044*    (2006.01)
(Continued)

(52) U.S. Cl.
CPC .......... *G06F 3/0412* (2013.01); *G06F 3/0443* (2019.05); *G06F 3/0446* (2019.05);
(Continued)

(58) Field of Classification Search
CPC .... G06F 3/0412; G06F 3/0446; G06F 3/0443; G06F 2203/04111; G06F 2203/04112; G02B 1/02; G02B 3/0056
See application file for complete search history.

(56) References Cited

U.S. PATENT DOCUMENTS 5,990,850 A * 11/1999 Brown ................... B82Y 20/00
                                                          343/909
8,591,279 B1 * 11/2013 Cok ...................... H05K 9/0096
                                                           445/24
(Continued)

FOREIGN PATENT DOCUMENTS

CN    108153442    6/2018
CN    108762571    11/2018

*Primary Examiner* — Dmitriy Bolotin

(57) ABSTRACT

A display panel including a touch function structure, wherein the touch function structure includes a protective layer, a metal mesh layer, and a dimming structure layer. The metal mesh layer comprises first metal traces and second metal traces, and the first metal traces and the second metal traces intersect to form vacant regions; the dimming structure layer comprises microstructures for adjusting a light emitting effect of the display panel, and an orthographic projection of each of the microstructures on an encapsulation layer is located within an orthographic projection of each of the vacant regions on the encapsulation layer.

16 Claims, 2 Drawing Sheets

(51) Int. Cl.
*G02B 1/02* (2006.01)
*G02B 3/00* (2006.01)

(52) U.S. Cl.
CPC .............. *G02B 1/02* (2013.01); *G02B 3/0056* (2013.01); *G06F 2203/04111* (2013.01); *G06F 2203/04112* (2013.01)

(56) References Cited

U.S. PATENT DOCUMENTS

| | | | |
|---|---|---|---|
| 2003/0071564 A1* | 4/2003 | Hirayama | G02B 6/1225 313/501 |
| 2008/0079866 A1* | 4/2008 | Mimura | G02F 1/133524 349/61 |
| 2009/0302744 A1* | 12/2009 | Kim | H01L 51/5253 313/504 |
| 2016/0041643 A1* | 2/2016 | Gu | G06F 3/044 345/174 |
| 2018/0122864 A1* | 5/2018 | Lee | G06F 3/0412 |
| 2018/0157357 A1* | 6/2018 | Lin | G02F 1/1368 |
| 2018/0157358 A1* | 6/2018 | Lin | G02F 1/13338 |
| 2018/0157359 A1* | 6/2018 | Lin | H01L 27/1225 |
| 2018/0158842 A1* | 6/2018 | Lius | H01L 27/323 |
| 2018/0158843 A1* | 6/2018 | Lius | H01L 27/1248 |
| 2018/0175327 A1* | 6/2018 | Jang | H01L 51/5225 |
| 2019/0067383 A1* | 2/2019 | Jo | H01L 51/5284 |
| 2019/0103442 A1* | 4/2019 | Choi | H01L 51/5221 |
| 2019/0258349 A1* | 8/2019 | Lius | H01L 27/124 |
| 2019/0319051 A1* | 10/2019 | Lin | H01L 29/7869 |
| 2019/0369784 A1 | 12/2019 | Yao et al. | |
| 2019/0386070 A1 | 12/2019 | Lee et al. | |
| 2020/0083484 A1* | 3/2020 | Lee | H01L 51/5256 |
| 2020/0321558 A1* | 10/2020 | Guo | H01L 27/3244 |

\* cited by examiner

DISPLAY PANEL

RELATED APPLICATIONS

This application is a National Phase of PCT Patent Application No. PCT/CN2019/072070 having International filing date of Jan. 17, 2019, which claims the benefit of priority of Chinese Patent Application No. 201811520627.4 filed on Dec. 12, 2018. The contents of the above applications are all incorporated by reference as if fully set forth herein in their entirety.

FIELD AND BACKGROUND OF THE INVENTION

The present invention relates to the field of display technologies, and in particular, to a display panel.

With the development of touch display panels, the current touch structures in the industry have evolved from an external type to an on-cell TP (DOT) structure, which can be applied to corresponding products (such as SAMSUNG S8, NOTE 7, etc.), so that the thickness of a display can be greatly reduced. DOT is manufactured by forming a touch function layer with a metal mesh after the deposition of an encapsulation layer, and its structure design is shown in FIG. 1.

However, the light emitting efficiency of this structure is poor, especially at night.

SUMMARY OF THE INVENTION

The embodiments of the present application provide a display panel to solve the technical problem that the light emitting efficiency of the existing display panel is poor.

The embodiments of the present application provide a display panel comprising an encapsulation layer and a touch function structure formed on the encapsulation layer, wherein the touch function structure comprises:

a protective layer disposed on the encapsulation layer for protecting the encapsulation layer;

a metal mesh layer disposed on the encapsulation layer; and a dimming structure layer disposed on the encapsulation layer;

the metal mesh layer comprises a plurality of first metal traces extending along a first direction and a plurality of second metal traces extending along a second direction, the first metal traces and the second metal traces intersect to form a plurality of vacant regions;

wherein the dimming structure layer comprises a plurality of microstructures for adjusting a light emitting effect of the display panel, and an orthographic projection of each of the microstructures on the encapsulation layer is located within an orthographic projection of each of the vacant regions on the encapsulation layer;

the microstructures are arranged in an array; and the microstructures comprise at least one of light transmissive metal bodies, two-dimensional photonic crystals, and micro-lenses.

In the display panel of the present application, the touch function structure comprises an insulating layer; the metal mesh layer and the dimming structure layer are both disposed on the protective layer, and the insulating layer covers the metal mesh layer and the dimming structure layer, the microstructures and the metal mesh layer are spaced from each other and the microstructures are disposed in the vacant regions.

In the display panel of the present application, the touch function structure comprises the insulating layer; the dimming structure layer is disposed on the protective layer, the insulating layer is disposed on the dimming structure layer, the metal mesh layer is disposed on the insulating layer, and the microstructures are correspondingly disposed below the vacant regions.

In the display panel of the present application, the dimming structure layer is disposed on the encapsulation layer, the protective layer is disposed on the dimming structure layer, the metal mesh layer is disposed on the protective layer, and the microstructures are correspondingly disposed below the vacant regions.

In the display panel of the present application, each of the two-dimensional photonic crystals comprises a $SiN_x$ crystal and/or a $SiO_2$ crystal, and each of the micro-lenses each comprises a spherical lens and/or an aspheric lens.

In the display panel of the present application, the metal traces of the metal mesh layer are enclosed to form a plurality of touch electrodes, and the plurality of touch electrodes comprise a plurality of first touch electrodes and second touch electrodes which are intersected and insulated from each other.

In the display panel of the present application, the display panel further comprises a plurality of bridges, wherein two adjacent second touch electrodes are electrically connected by each of the bridges.

In the display panel of the present application, an orthographic projection of each of the bridges on the encapsulation layer and an orthographic projection of each of the microstructures on the encapsulation layer are spaced from each other.

The embodiments of the present application further provide a display panel comprising an encapsulation layer and a touch function structure formed on the encapsulation layer, wherein the touch function structure comprises:

a protective layer disposed on the encapsulation layer for protecting the encapsulation layer;

a metal mesh layer disposed on the encapsulation layer; and a dimming structure layer disposed on the encapsulation layer;

the metal mesh layer comprises a plurality of first metal traces extending along a first direction and a plurality of second metal traces extending along a second direction, the first metal traces and the second metal traces intersect to form a plurality of vacant regions;

wherein the dimming structure layer comprises a plurality of microstructures for adjusting a light emitting effect of the display panel, and an orthographic projection of each of the microstructures on the encapsulation layer is located within an orthographic projection of each of the vacant regions on the encapsulation layer.

In the display panel of the present application, the touch function structure comprises an insulating layer; the metal mesh layer and the dimming structure layer are both disposed on the protective layer, and the insulating layer covers the metal mesh layer and the dimming structure layer, the microstructures and the metal mesh layer are spaced from each other and the microstructures are disposed in the vacant regions.

In the display panel of the present application, the touch function structure comprises an insulating layer, the dimming structure layer is disposed on the protective layer, the insulating layer is disposed on the dimming structure layer;

the metal mesh layer is disposed on the insulating layer, and the microstructures are correspondingly disposed below the vacant regions.

In the display panel of the present application, the dimming structure layer is disposed on the encapsulation layer, the protective layer is disposed on the dimming structure layer, the metal mesh layer is disposed on the protective layer, and the microstructures are correspondingly disposed below the vacant regions.

In the display panel of the present application, the microstructures are arranged in an array.

In the display panel of the present application, the microstructures comprise at least one of light transmissive metal bodies, two-dimensional photonic crystals, and micro-lenses.

In the display panel of the present application, each of the two-dimensional photonic crystals each comprises a $SiN_x$ crystal and/or a $SiO_2$ crystal, and each of the micro-lenses comprises a spherical lens and/or an aspheric lens.

In the display panel of the present application, the metal traces of the metal mesh layer are enclosed to form a plurality of touch electrodes, and the plurality of touch electrodes comprise a plurality of first touch electrodes and second touch electrodes which are intersected and insulated from each other.

In the display panel of the present application, the display panel further comprises a plurality of bridges, wherein two adjacent second touch electrodes are electrically connected by each of the bridges.

In the display panel of the present application, an orthographic projection of each of the bridges on the encapsulation layer and an orthographic projection of each of the microstructures on the encapsulation layer are spaced from each other.

Compared to display panels of the prior art, the display panel of the present application adjusts the light emitting of the display panel by the microstructure of the dimming structure layer, thereby, the light emitting of the display panel is more uniform and the light emitting efficiency is greater. The technical problem of low light emitting efficiency of the existing display panel is solved.

BRIEF DESCRIPTION OF THE SEVERAL VIEWS OF THE DRAWINGS

In order to describe clearly the embodiment in the present disclosure or the prior art, the following will introduce the drawings for the embodiment shortly. Obviously, the following description is only a few embodiments, for the common technical personnel in the field it is easy to acquire some other drawings without creative work.

DESCRIPTION OF SPECIFIC EMBODIMENTS OF THE INVENTION

Figure 1:
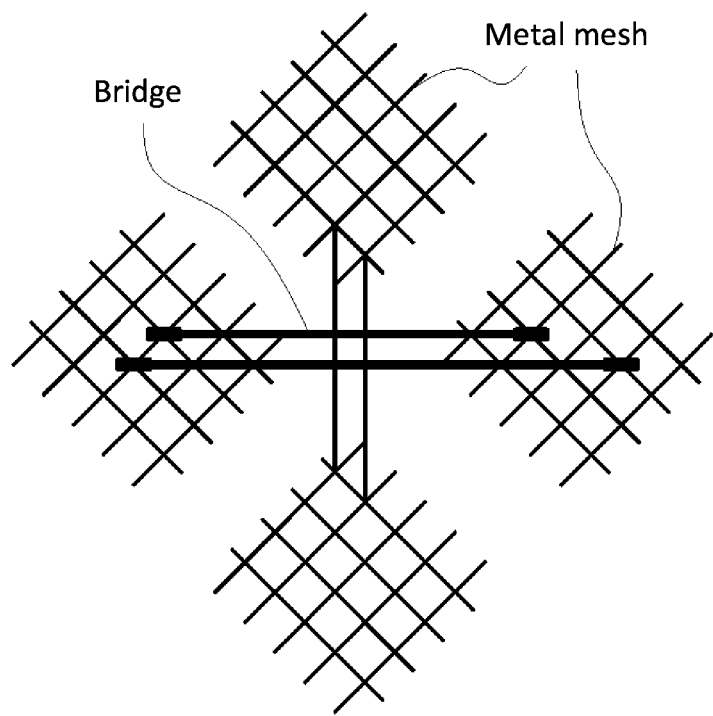
FIG. 1 is a structural diagram of a touch function layer of a touch display panel of prior art.

Please refer to the drawings in the drawings, in which the same component symbols represent the same components. The following description is based on the specific embodiments of the present invention as illustrated, and should not be construed as limiting of the specific embodiments that are not described herein.

Figure 2:
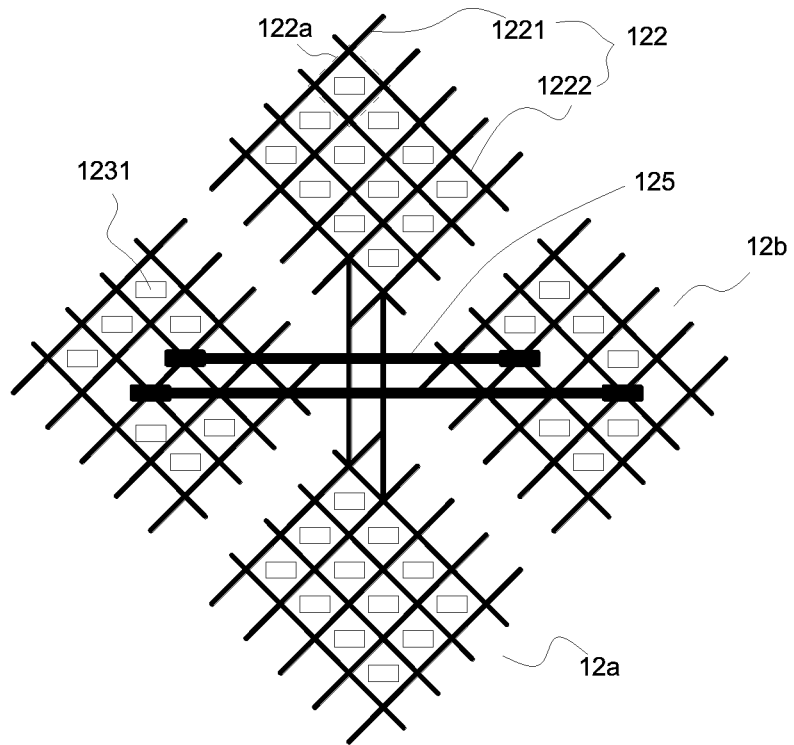
FIG. 2 is a structural diagram of a dimming structure layer, a metal mesh layer, and a bridge of a first embodiment of a display panel of the present application.
Figure 3:
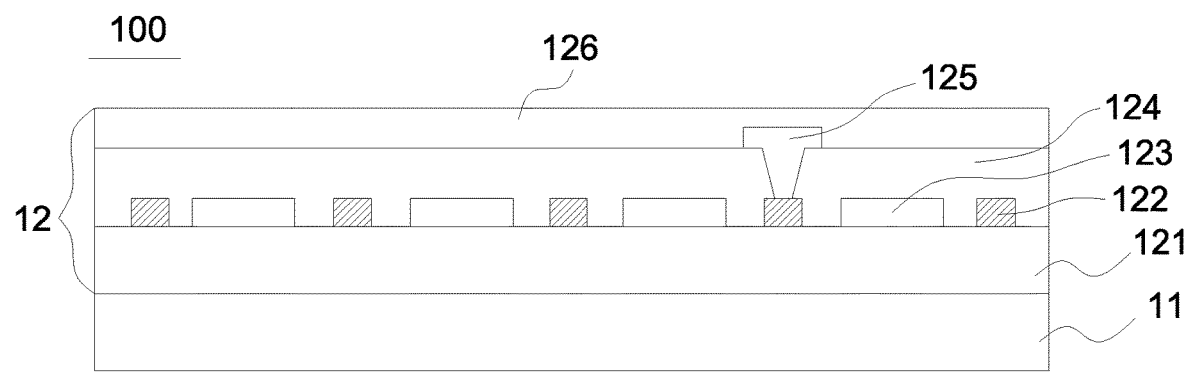
FIG. 3 is a structural diagram of a display panel in the first embodiment of the present application (only a portion of a single second touch electrode is shown)

Please refer to FIG. 2 and FIG. 3, FIG. 2 is a structural diagram of a dimming structure layer, a metal mesh layer, and a bridge of a first embodiment of a display panel of the present application; FIG. 3 is a structural diagram of a display panel in a first embodiment of the present application (only a portion of a single second touch electrode is shown).

The display panel 100 of the first embodiment of the present application includes an encapsulation layer 11 and a touch function structure 12 formed on the encapsulation layer 11. The touch function structure 12 includes a protective layer 121, a metal mesh layer 122, a dimming structure layer 123, an insulating layer 124, and a bridge 125.

The protective layer 121 is disposed on the encapsulation layer 11 for protecting the encapsulation layer 11. The metal mesh layer 122 is disposed on the encapsulation layer 11. The dimming structure layer 123 is disposed on the encapsulation layer 11. Specifically, in the first embodiment, the metal mesh layer 122 and the dimming structure layer 123 are both disposed on the protective layer 121, and the insulating layer 124 covers the metal mesh layer 122 and the dimming structure layer 123.

The metal mesh layer 122 includes a plurality of first metal traces 1221 extending along a first direction and a plurality of second metal traces 1222 extending along a second direction. The first metal traces 1221 and the second metal traces 1222 are intersected to form a plurality of vacant regions 122a. The dimming structure layer 123 includes a plurality of microstructures 1231 for adjusting the light emitting efficiency of the light emitted by the display panel 100.

An orthographic projection of the microstructures 1231 on the encapsulation layer 11 is within an orthographic projection of a vacant area 122a on the encapsulation layer 11. In the present embodiment, the microstructures 1231 and the metal mesh layer 122 are spaced from each other and the microstructures 1231 are disposed in the vacant area 122a.

In addition, a dimming principle of the microstructure 1231 is to change a light transmission direction by changing a refraction angle and a reflection angle of the emitted light, thereby adjusting the light emitting efficiency.

In the first embodiment, the dimming structure layer 123 and the metal mesh layer 122 are disposed in a same layer to avoid part of the light being blocked by the metal mesh layer 122 after the emitted light being adjusted by the microstructures 1231 of the dimming structure layer 123, thereby improving the light emitting effect.

In the first embodiment, the first direction and the second direction are orthogonal to each other. Of course, the first direction and the second direction may also be non-orthogonal, which is not limited by the present application.

In the first embodiment, the microstructures 1231 are arranged in an array. Such an arrangement increases the balance of the arrangement of the microstructures 1231, thereby improving the light emitting efficiency. Of course, when the microstructures 1231 are arranged in a matrix, it can be set according to a specific situation. For example, if blue light needs to be brighter, the microstructures are placed above blue sub-pixels. If it is desired to increase brightness of peripheral edges of the display panel, microstructures or microstructures having a density larger than that of an intermediate portion can be disposed in a peripheral edge region of the display panel.

In addition, the microstructures comprise at least one of light transmissive metal bodies, two-dimensional photonic crystals, and micro-lenses. That is, the microstructures can comprise only one of light transmissive metal bodies, two-dimensional photonic crystals, and micro-lenses, and can also comprise two or three of light transmissive metal bodies, two-dimensional photonic crystals, and micro-lenses.

Optionally, each of the two-dimensional photonic crystals comprises a $SiN_x$ crystal and/or a $SiO_2$ crystal, and each of the micro-lenses comprises a spherical lens and/or an aspheric lens. That is, each of the two-dimensional photonic crystals comprises a $SiN_x$ crystal or a $SiO_2$ crystal, and it can also comprise a $SiN_x$ crystal and a $SiO_2$ crystal. Each of the micro-lenses comprises a spherical lens or an aspheric lens, and it can also comprise a spherical and an aspheric lens.

Further, at least part of light emitting surfaces of the microstructures 1231 are concave-convex curved surfaces, such as a zigzag shape, a wave shape, or the like. This setting improves the uniformity of the light and expands an angle of the emitting light. Moreover, due to concave-convex curved structures of the microstructures 1231, the adhesion stability of the microstructures 1231 and the insulating layer 124 is improved.

When the display panel of the present application is a flexible display panel, the concave-convex curved surface of the microstructure 1231 functions to release bending stress, which facilitates bending of the flexible display panel.

In the first embodiment, the metal traces (the first metal traces 1221 and the second metal traces 1222) of the metal mesh layer 122 enclose a plurality of touch electrodes. The plurality of touch electrodes include a plurality of first touch electrodes 12a and second touch electrodes 12b that are intersected and insulated from each other.

Wherein, the two adjacent second touch electrodes 12b are electrically connected by a bridge 125, and the adjacent two first touch electrodes 12a are directly connected by a trace.

The touch function structure 12 further includes an organic layer 126, the bridge 125 is disposed on the insulating layer 124, and the organic layer 126 is disposed on the bridge 125. Of course, in another embodiment, the bridge can be disposed on the encapsulation layer, the protective layer is disposed on the bridge, the metal mesh layer and the dimming structure layer are disposed on the protective layer, and the insulating layer is disposed on the metal mesh layer and the dimming structure layer.

Additionally, the orthographic projections of the bridges 125 on the encapsulation layer 11 and the orthographic projections of the microstructures 1231 on the encapsulation layer 11 are spaced from each other. Such an arrangement avoids part of the light being blocked by the front surfaces of the bridges 125 after the emitted light being adjusted by the microstructure 1231 of the dimming structure layer 123, and thereby improving the light-emitting effect.

Figure 4:
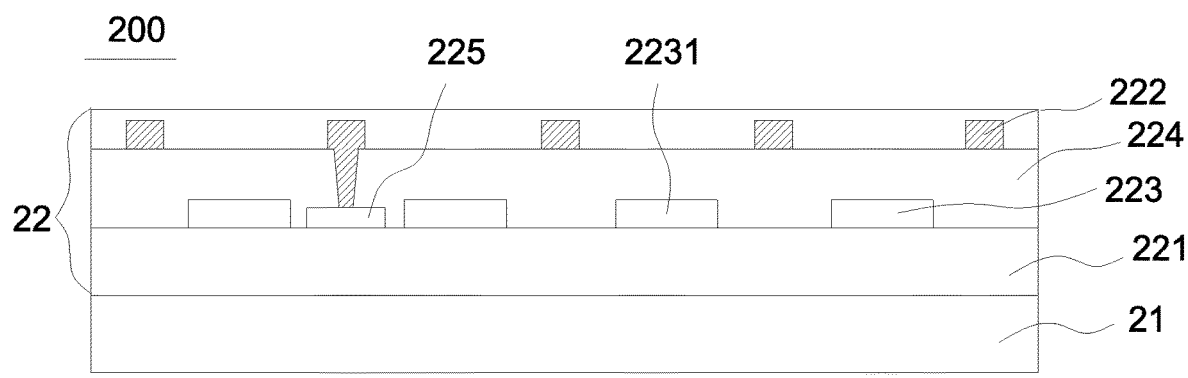
FIG. 4 is a structural diagram of a display panel in a second embodiment of the present application (only a portion of a single second touch electrode is shown)

Referring to FIG. 4, a display panel 200 of a second embodiment includes an encapsulation layer 21 and a touch function structure 22 formed on the encapsulation layer 21. The touch function structure 22 includes a protective layer 221, a metal mesh layer 222, a dimming structure layer 223, an insulating layer 224, and a bridge 225.

The differences between the present second embodiment and the first embodiment include: the touch function structure 22 including the insulating layer 224, the dimming structure layer 223 being disposed on the protective layer 221, the insulating layer 224 being disposed on the dimming structure layer, the metal mesh layer 222 being disposed on the insulating layer 224, and the microstructures 2231 being disposed below a vacant area. The bridge 225 and the dimming structure layer 223 are disposed in a same layer, and the bridge 225 is used to connect two adjacent second touch electrodes in the metal mesh layer 222.

In addition, a structure of the dimming structure layer 223 in the second embodiment is identical to a structure of the dimming structure layer in the first embodiment. Please refer to the content of the first embodiment for details which are not described herein again.

Figure 5:
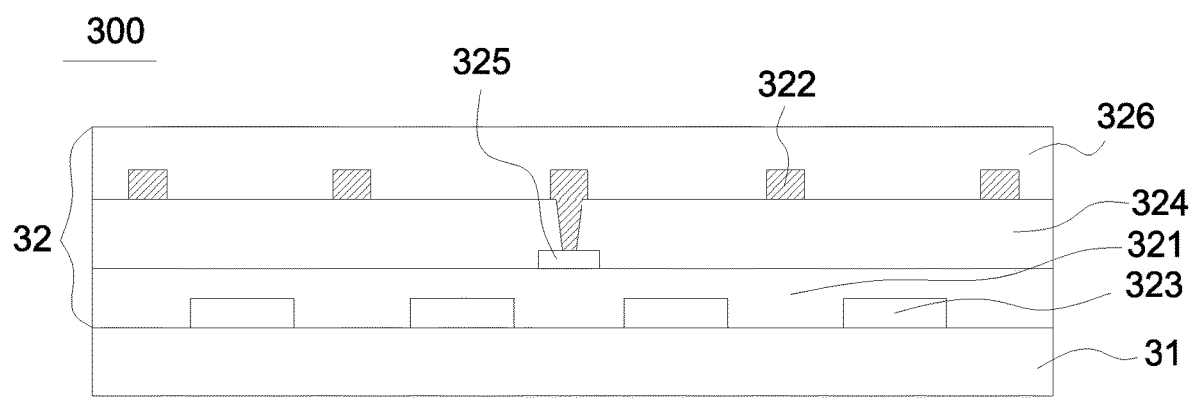
FIG. 5 is a structural diagram of a display panel in a third embodiment of the present application (only a portion of a single second touch electrode is shown).

Referring to FIG. 5, in a display panel 300 of a third embodiment, the display panel 300 includes an encapsulation layer 31 and a touch function structure 32 formed on the encapsulation layer 31. The touch function structure 32 includes a protective layer 321, a metal mesh layer 322, a dimming structure layer 323, an insulating layer 324, a bridge 325, and an organic layer 326.

The third embodiment is different from the first embodiment in that the dimming structure layer 323 is disposed on the encapsulation layer 31. The protective layer 321 is disposed on the light modulating structure layer 323. The bridge 325 is disposed on the protective layer 321. The insulating layer 324 is disposed on the bridge 325. The metal mesh layer 322 is disposed on the insulating layer 324. The organic layer 326 is disposed on the metal mesh layer 322. The microstructures 3231 are correspondingly disposed below a vacant area.

In addition, a structure of the dimming structure layer 223 in the third embodiment is identical to the structure of the dimming structure layer in the first embodiment. Please refer to the content of the first embodiment for details which are not described herein again.

Compared to display panels of prior art, the display panel of the present application adjusts the light emitting of the display panel by the microstructure of the dimming structure layer, thereby, the light emitting of the display panel is more uniform and the light emitting efficiency is greater. The technical problem of low light emitting efficiency of the existing display panel is solved.

As described above, those skilled in the art can make various changes and modifications in accordance with the technical solutions and technical concept of the present invention, and all such changes and modifications should fall within the scope of the appended claims.

What is claimed is:

1. A display panel comprising an encapsulation layer and a touch function structure formed on the encapsulation layer, wherein the touch function structure comprises:
   a protective layer disposed on the encapsulation layer to protect the encapsulation layer;
   a metal mesh layer disposed on the encapsulation layer; and
   a dimming structure layer disposed on the encapsulation layer;
   the metal mesh layer comprises a plurality of first metal traces extending along a first direction and a plurality of second metal traces extending along a second direction, and the first metal traces and the second metal traces intersect to form a plurality of vacant regions;
   wherein the dimming structure layer comprises a plurality of microstructures to adjust a light emitting effect of the display panel, an orthographic projection of each of the microstructures on the encapsulation layer is located within an orthographic projection of each of the vacant regions on the encapsulation layer; the touch function structure comprises an insulating layer, the metal mesh layer and the dimming structure layer are both disposed on the protective layer, the insulating layer covers the metal mesh layer and the dimming structure layer, the microstructures and the metal mesh layer are spaced from each other, and the microstructures are disposed in the vacant regions.

2. The display panel according to claim 1, wherein the microstructures are arranged in an array.

3. The display panel according to claim 1, wherein the microstructures comprise a light transmissive element.

4. The display panel according to claim 3, wherein the light transmissive element comprises at least one of light transmissive metal bodies, two-dimensional photonic crystals, or micro-lenses.

5. The display panel according to claim 4, wherein each of the two-dimensional photonic crystals comprises a $SiN_x$ crystal and/or a $SiO_2$ crystal.

6. The display panel according to claim 1, wherein the first metal traces and the second metal traces of the metal mesh layer are enclosed to form a plurality of touch electrodes, and the plurality of touch electrodes comprise a plurality of first touch electrodes and second touch electrodes which are intersected and insulated from each other.

7. The display panel according to claim 6, wherein the display panel further comprises a plurality of bridges, wherein two adjacent second touch electrodes are electrically connected by each of the bridges.

8. The display panel according to claim 7, wherein an orthographic projection of each of the bridges on the encapsulation layer and the orthographic projection of each of the microstructures on the encapsulation layer are spaced from each other.

9. A display panel comprising an encapsulation layer and a touch function structure formed on the encapsulation layer, wherein the touch function structure comprises:
 a protective layer disposed on the encapsulation layer to protect the encapsulation layer;
 a metal mesh layer disposed on the encapsulation layer; and
 a dimming structure layer disposed on the encapsulation layer;

the metal mesh layer comprises a plurality of first metal traces extending along a first direction and a plurality of second metal traces extending along a second direction, and the first metal traces and the second metal traces intersect to form a plurality of vacant regions;
wherein the dimming structure layer comprises a plurality of microstructures to adjust a light emitting effect of the display panel, an orthographic projection of each of the microstructures on the encapsulation layer is located within an orthographic projection of each of the vacant regions on the encapsulation layer; the touch function structure comprises an insulating layer, the dimming structure layer is disposed on the protective layer, the insulating layer is disposed on the dimming structure layer, the metal mesh layer is disposed on the insulating layer, and the microstructures are correspondingly disposed below the vacant regions.

10. The display panel according to claim 9, wherein the microstructures are arranged in an array.

11. The display panel according to claim 10, wherein the microstructures comprise a light transmissive element.

12. The display panel according to claim 11, wherein the light transmissive element comprises at least one of light transmissive metal bodies, two-dimensional photonic crystals, or micro-lenses.

13. The display panel according to claim 12, wherein each of the two-dimensional photonic crystals comprises a $SiN_x$ crystal and/or a $SiO_2$ crystal.

14. The display panel according to claim 9, wherein the first metal traces and the second metal traces of the metal mesh layer are enclosed to form a plurality of touch electrodes, and the plurality of touch electrodes comprise a plurality of first touch electrodes and second touch electrodes which are intersected and insulated from each other.

15. The display panel according to claim 14, wherein the display panel further comprises a plurality of bridges, wherein two adjacent second touch electrodes are electrically connected by each of the bridges.

16. The display panel according to claim 15 wherein an orthographic projection of each of the bridges on the encapsulation layer and the orthographic projection of each of the microstructures on the encapsulation layer are spaced from each other.

* * * * *